Patented May 6, 1941

2,241,354

UNITED STATES PATENT OFFICE 2,241,354

METHOD FOR MAKING HIGH TEMPERATURE REFRACTORIES

Russell E. Lowe, East Orange, and Allen G. Griswold, Westfield, N. J., assignors to Cities Service Oil Company, New York, N. Y., a corporation of Pennsylvania No Drawing. Application February 8, 1938, Serial No. 189,358

2 Claims. (Cl. 106—9)

The present invention relates to the manufacture of refractories, particularly to a refractory having a high thermal conductivity and adapted to withstand relatively high temperatures.

In the manufacture of refractory articles, particularly of those adapted for use as electrical resistance heating elements, it has been the aim of investigators in this field to increase the heat conductivity of refractory heating plates to a value as near as possible to that possessed by iron and steel. With this object in mind research engineers have attempted to incorporate metallic silicon and its various alloys into refractory heating plates because of the excellent heat conducting properties shown by these materials. However, their use, in the past, has been limited by the fact that in the manner they were used, silicon and ferrosilicon were not sufficiently resistant to chemical attack, and further, that they tend to swell and show undue expansion when subjected to high temperatures.

Important objects of the present invention are to provide a material or compositon capable of long use at relatively high temperatures, which has a high heat conductivity substantially equal to that of steel, comparatively resistant to high compression loads at high temperatures, possesses good dielectric properties, and is relatively inexpensive to manufacture.

Another object of the invention is to provide a method of making refractories which have the properties of long life at high temperatures, high heat conductivity, possesses good dielectric properties and is inexpensive to manufacture.

With the above and other objects and features in view the invention is hereinafter described in detail and particularly defined by the accompanying claims.

As a result of the preferred method of making the refractory, there is obtained a dense high temperature resistant refractory, having thermal conductivity substantially equal to that of steel, which is particularly adapted for use in the manufacture of electrical resistance heating units by embedding in the refractory appropriate resistance heating coils or elements. An example of the preferred method of manufacture is as follows:

Ferrosilicon (75% to 95% grade) is milled so that most of the milled material will pass through a 100 mesh screen. A batch of the ferrosilicon is then put into a roasting furnace and the temperature raised to about 2300° F. and maintained at this temperature for a period of about four hours. After roasting the ferrosilicon for that period of time at the temperature mentioned above, and in the presence of air or oxygen, a partial oxidation of the ferrosilicon is effected so that each particle of ferrosilicon will become coated with an oxide film. In an alternate method, the roasting furnace can be provided with a blower or pump for forcing into the furnace streams of oxygen or air to facilitate and hasten the oxidizing action. By controlling the flow of air to the furnace the rate of speed and amount of oxidation of the material in the furnace can be carefully controlled. The oxide coated ferrosilicon is then taken from the roasting furnace and is thereafter used as one of the major constituents of the preferred refractory. The oxide film formed on the ferrosilicon plays an important part in the practise of the present invention. Tests conducted have proven that the oxide film serves as an excellent dielectric.

The mixture used in the refractory is made up by mixing in a dry state, 80% by weight of the partially oxidized ferrosilicon, 14% by weight of the finely ground zircon (150 mesh), 2% by weight of bentonite, and 4% by weight of borosilicate glass which has been previously ground to a fineness such that it will pass through a 200 mesh screen. These ingredients are thoroughly mixed and then wetted with a wetting agent which is preferably sulfite liquor, a residue in pulp manufacture, in an amount sufficient to form a plastic, pasty mass. The plastic mass is then cast into the desired shape or shapes with embedded resistance elements, put into a furnace and the temperature gradually raised from the initial firing temperature until a temperature of about 2000° F. is reached. As the firing operation is continued and the temperature rises, the borosilicate glass which is intimately dispersed throughout the mass will become fused and cemented to the particles of zircon, bentonite and ferrosilicon, to form the desired bonded refractory unit. The sulfite liquor acts to bond the ingredients of the mixture at low temperatures, but before the temperature reaches the maximum of 2000° F., the sulfite liquor will have been driven out of the mass.

In the practice of the invention, it is important that no bonding agent be used that would destroy the oxide film that is present on the particles of ferrosilicon. For this reason sulfite liquor is used rather than the customary and usual acidic bonding agents such as phosphoric acid.

While partially (film) oxidized ferrosilicon as used in the example cited above, is the preferred material to be used, it is within the scope of this invention to employ other substances or compounds containing silicon in substantial amounts. Compounds such as silicon alloys of cobalt, nickel, manganese, chromium, vanadium, titanium, tungsten or molybdenum may be used to advantage with or in place of ferrosilicon. These materials can be partially oxidized in the same manner as the ferrosilicon used in the example cited.

Other types of colloidal clays can be substituted for the bentonite mentioned in the preferred example. For example, mixtures of colloidal silicates and fine grain kaolinite, or clays of the halloysite and montmorillonite type can be used.

While borosilicate glass is preferred, it is within the scope of this invention to make use of such glasses as flint, crown, or any type of hard glass available.

In the manufacture of refractories or hot plates made in accordance with this invention, the proportion of ingredients can be varied to suit particular needs. For example, the major ingredient, the film oxidized silicon alloy, can be used in ranges from 75% to 85% by weight of the total mixture. As silicon and its alloys are highly heat conductive, the greater the proportion of this material present in the finished product, the greater the heat conductivity the resulting refractory product will have. As the proportion of silicon or alloy is varied, the proportion of zircon can be inversely varied. This is desired so that the usual swelling action of silicon can be balanced by the high shrinkage property of zircon at high temperatures. In the same manner the proportions of glass and colloidal clay can be varied in amounts of from 2% to 4% by weight of the mixture.

A refractory product as prepared in accordance with the disclosure herein may be cast, rammed, or molded into any shape and when containing an embedded resistance element is particularly adapted for use as electrical resistance heating units. Such heating units, particularly hot plates, can be made by embedding any type of resistance element between layers of the mixture while it is in a plastic state, and then firing as hereinbefore described. Resistance elements composed of nickel-chrome alloys also aluminum bearing alloys can be safely used since the mixture herein described is relatively inert, and will not chemically attack such resistance elements.

The preferred form of the invention having been thus described, what is claimed as new is:

1. The method of making a high temperature resistant refractory article which comprises, heating a metal containing substantial amounts of silicon in finely divided state in the presence of oxygen for several hours at a temperature above 2000° F. at which partial oxidation takes place forming oxide coated particles, mixing about 75–85 parts by weight of said oxide coated metal particles with about 9–19 parts of finely ground zircon and 2–4 parts each of colloidal clay and glass, wetting the mixture to a plastic state, shaping the article, and firing the article to a temperature sufficient to intimately bond the ingredients thereof.

2. The method of making a high temperature resistant refractory article which comprises heating finely divided ferrosilicon for several hours in the presence of oxygen at a temperature of approximately 2300° F. whereby to coat each ferrosilicon particle with an oxide film, mixing about 80 parts by weight of said oxide coated ferrosilicon with about 14 parts of finely ground zircon and 2–4 parts each of bentonite and finely ground borosilicate glass, wetting the mixture to a plastic state, shaping the article, and firing to a temperature of about 2000° F.

RUSSELL E. LOWE.
ALLEN G. GRISWOLD.